Sept. 8, 1925.
C. H. WILSON ET AL
1,552,789
MOTOR METER LOCK
Filed March 31, 1921
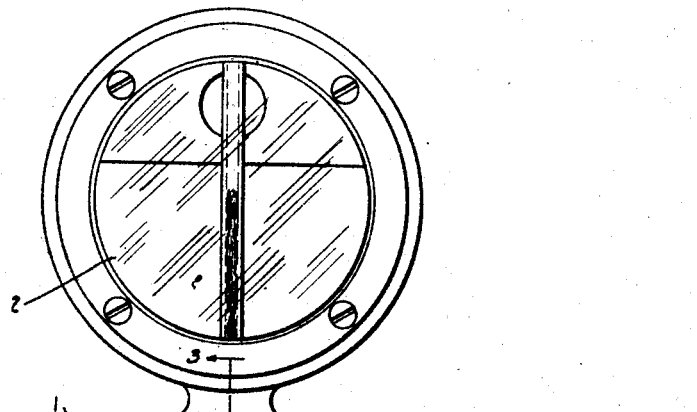
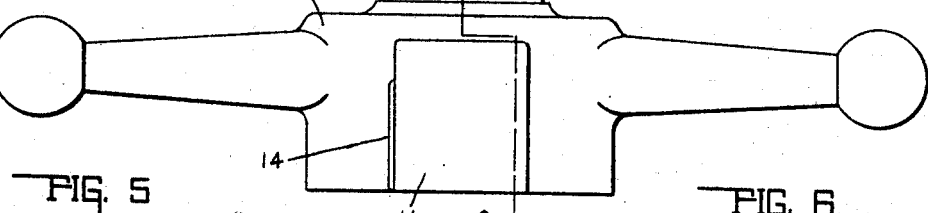
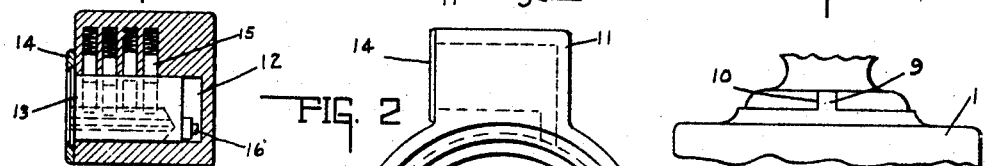
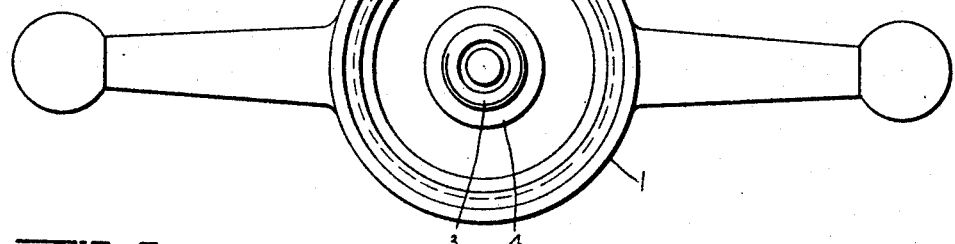
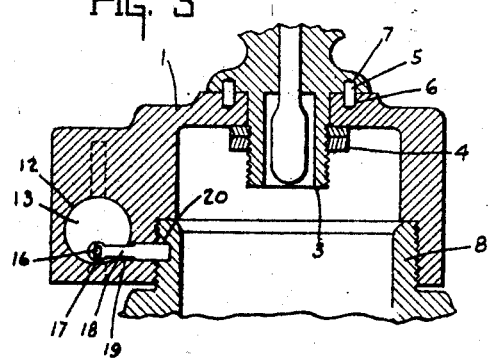
Inventors,
CHARLES H. WILSON.
PAUL J. BECKERICH.
By
Attorney Patented Sept. 8, 1925.

1,552,789

UNITED STATES PATENT OFFICE.

CHARLES H. WILSON AND PAUL J. BECKERICH, OF INDIANAPOLIS, INDIANA.

MOTOR-METER LOCK.

Application filed March 31, 1921. Serial No. 457,362.

*To all whom it may concern:*

Be it known that we, CHARLES H. WILSON and PAUL J. BECKERICH, citizens of the United States, residing at Indianapolis, in the county of Marion and State of Indiana, have invented certain new and useful Improvements in Motor-Meter Locks, of which the following is a specification.

This invention relates to improvements in motor meter locks, the prime feature of the invention being the provision of means for locking the motor meter to the cap for the radiator of a motor and then locking the cap to which the meter is attached to the neck of the radiator.

A further feature of the invention is in so constructing and positioning the locking elements that access may not be had thereto for releasing the cap or meter without employing the use of a key for releasing the locking mechanism for the cap.

Other objects and advantages will be hereinafter more fully set forth and pointed out in the accompanying specification.

In the accompanying drawings,

Figure 1 is an elevation of a radiator cap with a motor meter attached thereto,

Figure 2 is a bottom plan view thereof,

Figure 3 is a detail sectional view as seen on line 3—3, Figure 1, showing the cap locked to parts of the radiator, Figure 4 is a detail view showing the locking mechanism for the cap in unlocked position, Figure 5 is an enlarged detail sectional view through the housing for the cap lock, and Figure 6 is a detail elevation showing a modified means for securing the meter to the cap.

Referring to the drawings, 1 indicates a cap, such as is used to cover the filler opening in a radiator, and 2 indicates a motor meter, such as is employed for determining the temperature within the radiator. The lower end of the meter is provided with a hollow stem 3 which projects downwardly through an opening in the center of the cap 1, the exterior of the stem being threaded to receive lock nuts 4 which are on the interior of the cap, and to prevent the meter being turned in order to loosen the nuts 4, dowel pins 5 are introduced in sockets 6 and 7 in the cap and parts of the meter respectively, consequently when the nuts are turned onto the stem of the meter it will be impossible to remove the meter from the cap so long as the cap is in position on the neck portion 8 of the radiator. Instead of employing the dowel pins for holding the meter against rotation on the cap, a rib 9 may be formed on the cap which enters a notch 10 in parts of the meter, as shown in Figure 6, said rib holding the meter against rotation.

In order to hold the cap against removal from the neck of the radiator, a housing 11 is formed on the cap 1, preferably on one face thereof, in which is formed an opening 12, and in said opening is entered a lock cylinder 13 which may be of any preferred key-operated type, and said cylinder is held against removal from the opening 12 in any suitable manner, as by means of a plate 14 which is brazed or otherwise secured to the end of the housing and in position to contact with the outer end of the cylinder. Co-operating with the cylinder and parts of the housing are plungers 15 which are manipulated by means of a key (not shown) for releasing the cylinder so as to permit said cylinder to rotate. Fixed to the inner end of the cylinder 13 is a stud 16 which extends through an elongated slot 17 in the end of a locking bar 18, said bar normally resting in a horizontal position and extending through a bore 19 into a notch 20 in the face of the neck 8. The stud 16 is so located that when the cylinder 13 is rotated the locking bar 18 will be moved into or out of engagement with the notch 20.

After the cap has been properly screwed onto the neck 8, the cylinder 13 is rotated and the locking bar 18 moved into the notch 20, the plungers 15 at this time moving into locking position. As long as the bar 18 remains in the notch 20 it will be impossible to remove the cap from the radiator, and owing to the manner of securing the meter to the cap it will be impossible to remove the meter from the cap so long as the cap is in position on the neck, and consequently the meter cannot be stolen. In removing the cap from the radiator neck a key is inserted in the cylinder 13 and said cylinder rotated to disengage the bar 18 from the notch 20 and when the locking bar is moved to the position shown in Figure 4 the cap may be readily turned onto or removed from the neck.

Having thus fully described our said in- vention, what we claim as new and desire to secure by Letters Patent, is:

Motor meter locking means comprising an externally threaded radiator nipple having a radial orifice positioned below the top of the nipple and extending but part way through the wall thereof, an internally threaded cap having a substantially tangentially extending bore, a lock cylinder in said bore having a locking bolt movable into engagement with said orifice, a motor meter on the cap having a threaded neck extending therethrough, said motor meter provided with a notch in its periphery, a rib on the cap extending into said notch and securing the meter against rotation within the cap, and a nut on the said threaded neck beneath the cap, substantially as set forth.

In witness whereof, we have hereunto set our hands and seals at Indianapolis, Indiana, this 28th day of March, A. D. nineteen hundred and twenty-one.

CHARLES H. WILSON. [L. S.]
PAUL J. BECKERICH. [L. S.]